United States Patent [19]

Michaud et al.

[11] 4,358,895

[45] Nov. 16, 1982

[54] CONTINUOUS CONTACT GAGE FOR STRIP ROLLING PROCESS HAVING FLOATING MECHANISM

[75] Inventors: Orean E. Michaud, Bristol; George F. Kindl, Newington, both of Conn.

[73] Assignee: Colt Industries Operating Corp., West Hartford, Conn.

[21] Appl. No.: 277,899

[22] Filed: Jun. 26, 1981

[51] Int. Cl.³ ............................................. G01B 5/06
[52] U.S. Cl. ............................... 33/147 L; 33/147 N
[58] Field of Search ............ 33/143 R, 143 L, 143 F, 33/147 R, 147 E, 147 L, 147 N, 174 P

[56] References Cited

U.S. PATENT DOCUMENTS

| | | | |
|---|---|---|---|
| 2,115,351 | 4/1938 | Terry et al. | 33/147 L |
| 2,603,001 | 7/1952 | Fox et al. | 33/147 L |
| 2,955,358 | 10/1960 | Walkling | 33/143 F |
| 3,581,402 | 6/1971 | London et al. | 33/147 L |
| 3,750,294 | 8/1973 | Belke et al. | 33/147 L |
| 3,851,396 | 12/1974 | Klabunde | 33/147 N |
| 3,902,249 | 9/1975 | McClughan | 33/147 L |

FOREIGN PATENT DOCUMENTS

| | | | |
|---|---|---|---|
| 1095526 | 12/1960 | Fed. Rep. of Germany | 33/147 N |
| 46-10830 | 3/1971 | Japan | 33/147 L |

OTHER PUBLICATIONS

Instruction Book G-7110-1, Pratt & Whitney Machine Tool Division, Colt Industries Inc.
Vollmer America Inc. Brochure, Continuous on-line Gaging and Controls for Cold Rolling.

*Primary Examiner*—Richard R. Stearns
*Attorney, Agent, or Firm*—Radford W. Luther; Richard A. Dornon

[57] ABSTRACT

A continuous contact gage (10) for use in strip rolling processes has a main support frame (12) upon which is suspended a floating frame (22). The floating frame is suspended from four extension springs (24,26,28,30) such that the floating frame may translate in any direction and tilt about any horizontal axis. A torsion bar (36), mounted for lateral sliding movement, engages the floating frame in such a manner as to prevent any pivoting about the vertical axis so that the axes of the upper and lower gage rollers (60,62) of the gage head assembly will always remain perpendicular to the direction of strip movement. The gage head assembly is mounted upon the floating frame for vertical sliding movement and is urged upwardly by springs (90,94) attached to the floating frame to establish firm engagement between the lower gage roller and the undersurface of the strip. Two guide roll assemblies (120,122) respectively mounted upon the sides of the floating frame assure that the axes of the upper and lower gage rollers will always remain parallel to the surface of the strip, irrespective of the attitude of the floating frame.

5 Claims, 9 Drawing Figures

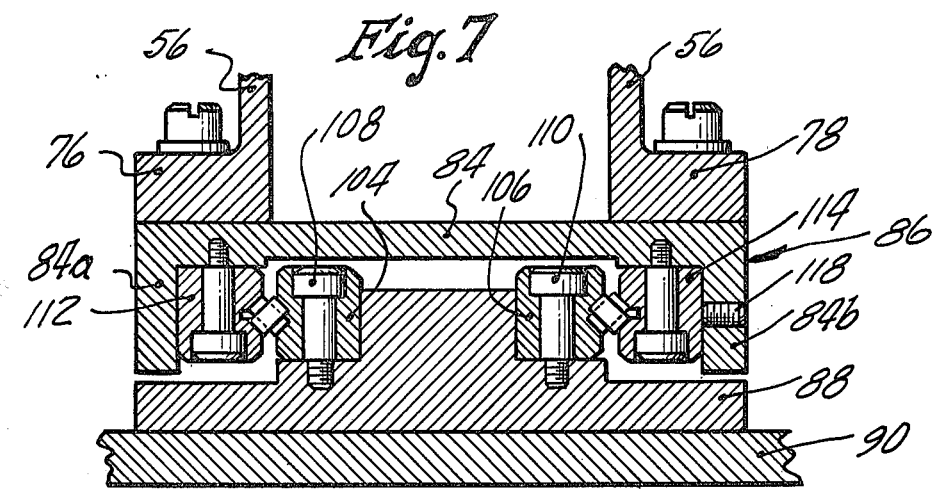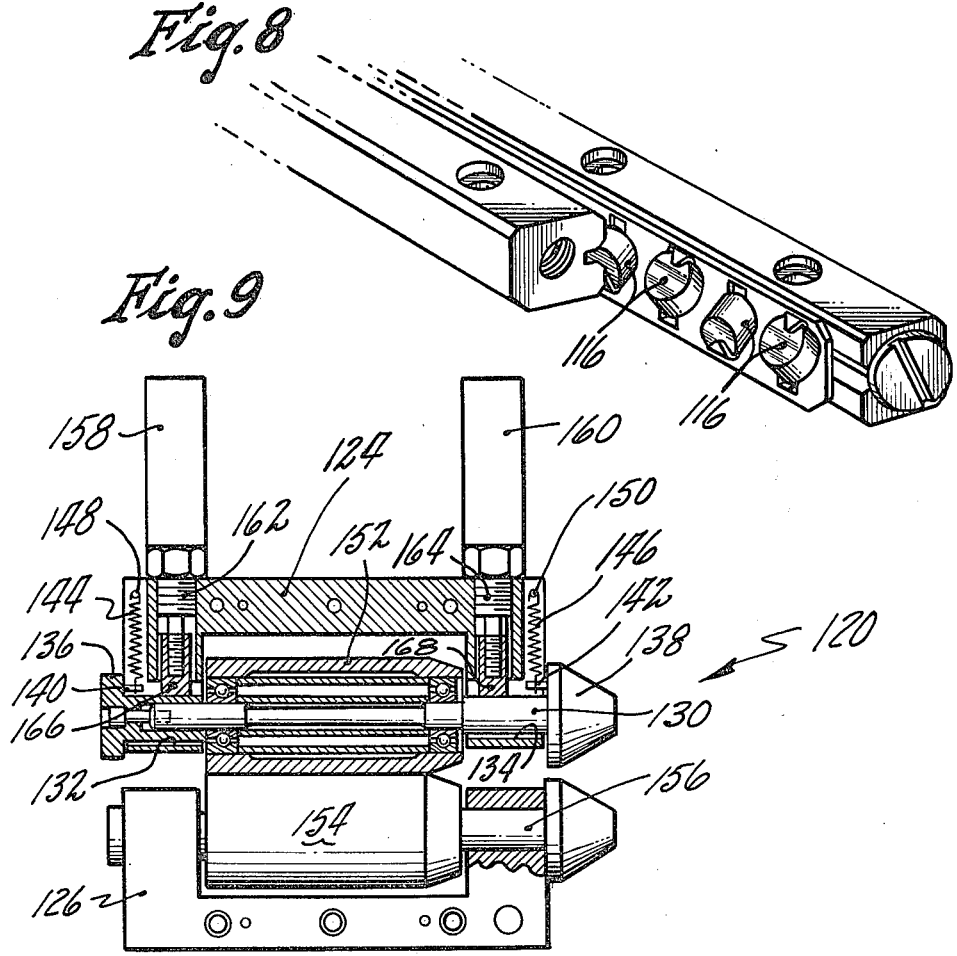

CONTINUOUS CONTACT GAGE FOR STRIP ROLLING PROCESS HAVING FLOATING MECHANISM

TECHNICAL FIELD

This invention relates to continuous contact gages for determining variations in the thickness of strip material as it is being cold rolled.

BACKGROUND ART

In the past, continuous contact gages have not possessed the inherent capability of assuming all attitudes of the rolled strip being measured. This drawback can lead to inaccuracies in the measurement being taken due to the lack of perpendicularity of the gaging line to the rolled strip. Although, there are state of the art continuous contact gages with heads that are pivotable about longitudinal and transverse axes and vertically movable, such movements are not sufficient to accomodate all attitudes of a rolled strip.

DISCLOSURE OF THE INVENTION

The invention provides a continuous contact gage for a rolled strip which incorporates a floating gaging mechanism capable of assuming the attitude of the rolled strip such that perpendicularity between the gaging line and the strip is continuously maintained. The gaging line, of course, is that imaginary line which intersects and is perpendicular to the axes of rotation of the upper and lower gage rolls and passes through their centers. The floating mechanism of the invention is unique in that it may undergo a translation in any direction and pivot about any horizontal axis, not simply a longitudinal axis and a lateral axis.

In accordance with the invention a floating frame is suspended upon a main support frame by means of extension springs. A gage head assembly, which incorporates upper and lower gage rolls, is slidably mounted upon the floating frame for vertical movement with respect thereto and is spring biased in an upward direction. The floating frame is prevented from pivoting about a vertical axis by means of a laterally slidable torsion bar mounted upon the main support frame, thereby to insure that the axes of the gage rollers always remain perpendicular to the direction of strip movement whereby wear on the gage rolls is minimized.

Accordingly, it is a primary object of the invention to provide a continuous contact gage for a rolled strip which incorporates a floating gaging mechanism capable of assuming the attitude of the rolled strip such that perpendicularity between the gaging line and the strip is continuously maintained.

This and other objects and advantages of the invention will become more readily apparent from the following detailed description, when taken in conjunction with the accompanying drawings, in which:

BRIEF DESCRIPTION OF DRAWINGS

FIG. 7 is a sectional view, taken substantially along the line 7—7 of FIG. 6, showing the roller slide assembly which interconnects the support bracket of the gage head assembly and the floating frame.

FIG. 8 is a perspective view showing the engagement between the right side rail and a V-way of FIG. 8.

FIG. 9 is a side view, partly in section, of the left guide roll assembly, per se.

BEST MODE FOR CARRYING OUT THE INVENTION

Figure 1:
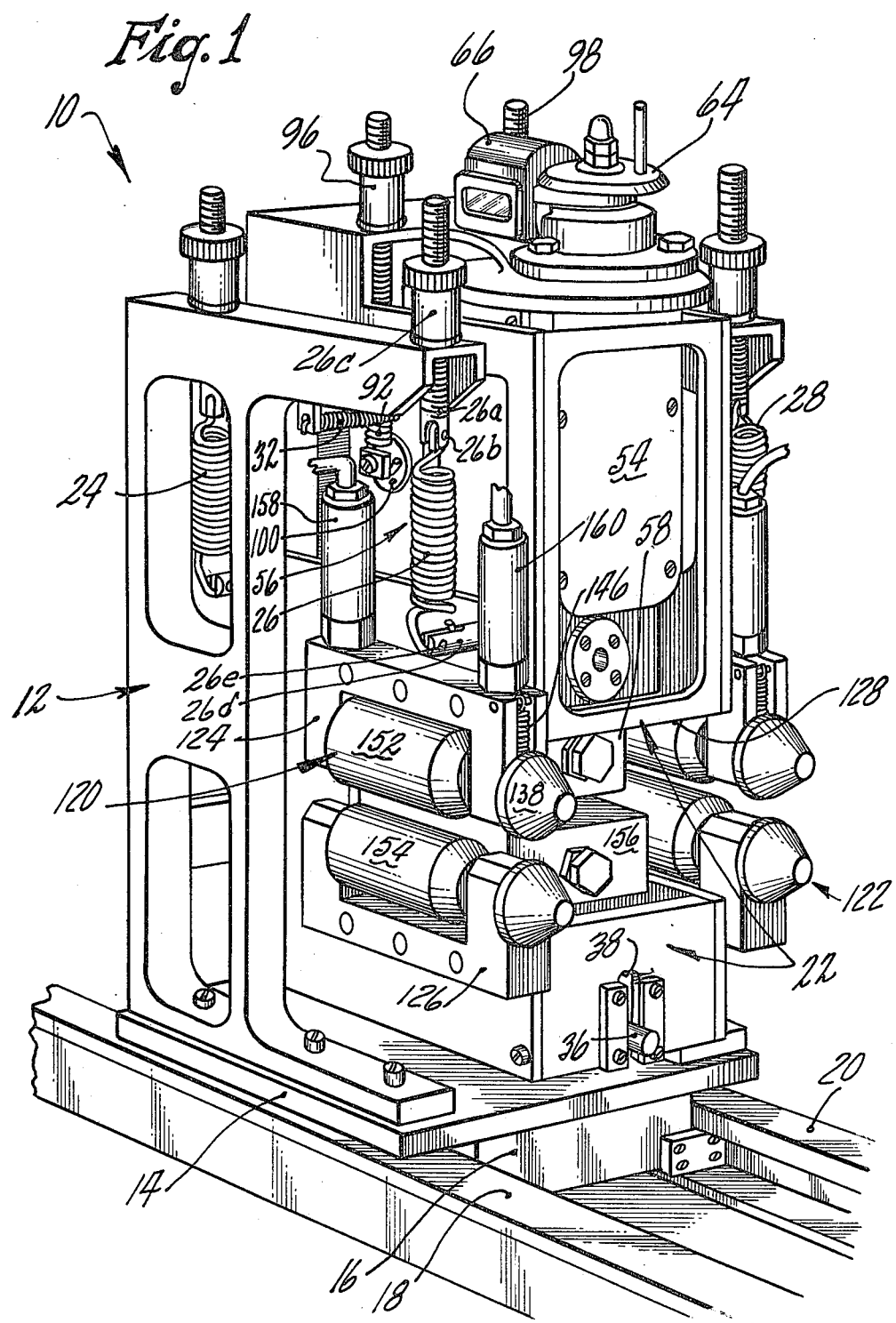
FIG. 1 is a perspective view of a preferred continuous contact gage according to the invention.
Figure 3:
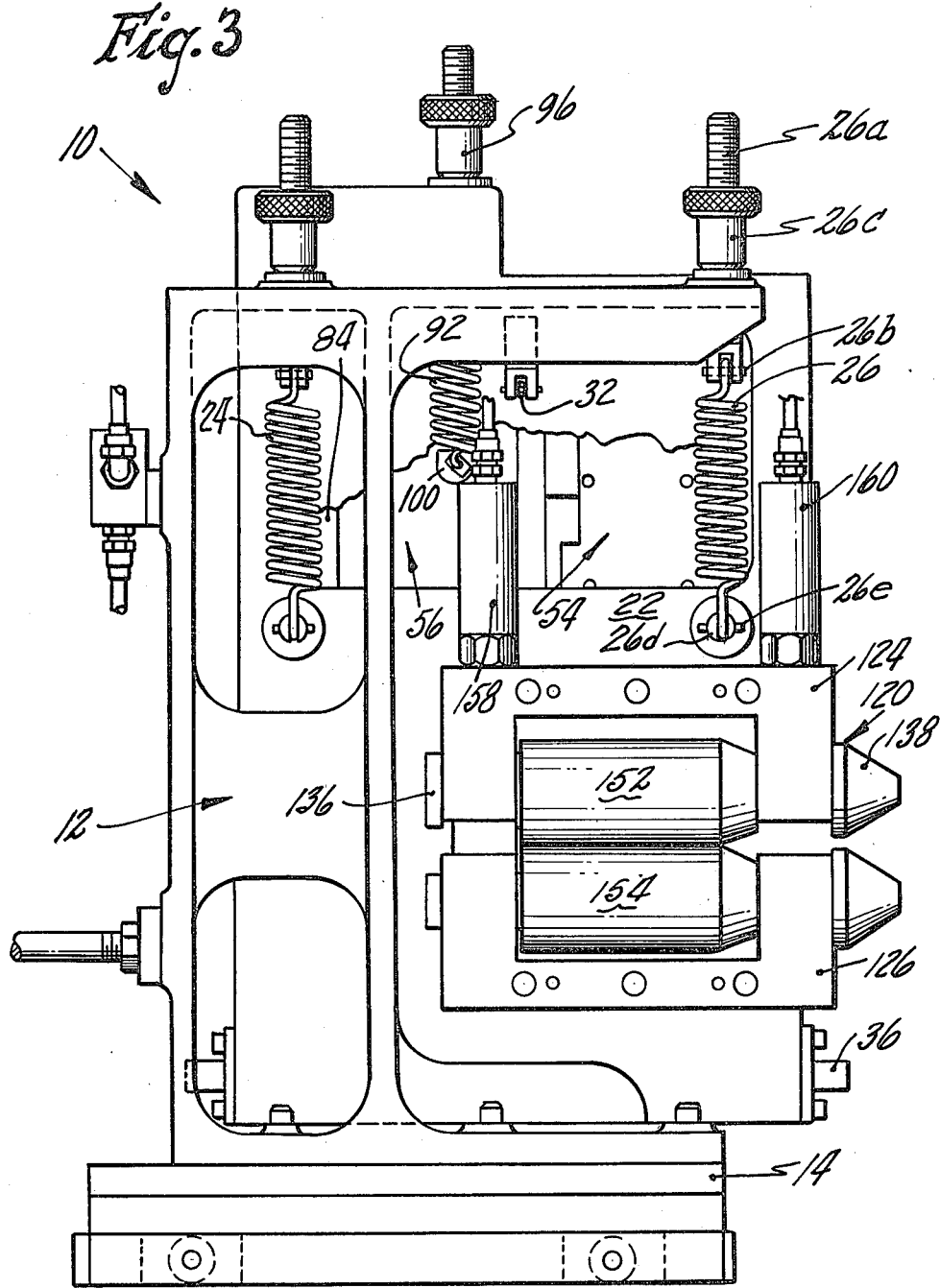
FIG. 3 is a side elevational view of the gage of FIG. 1.
Figure 4:
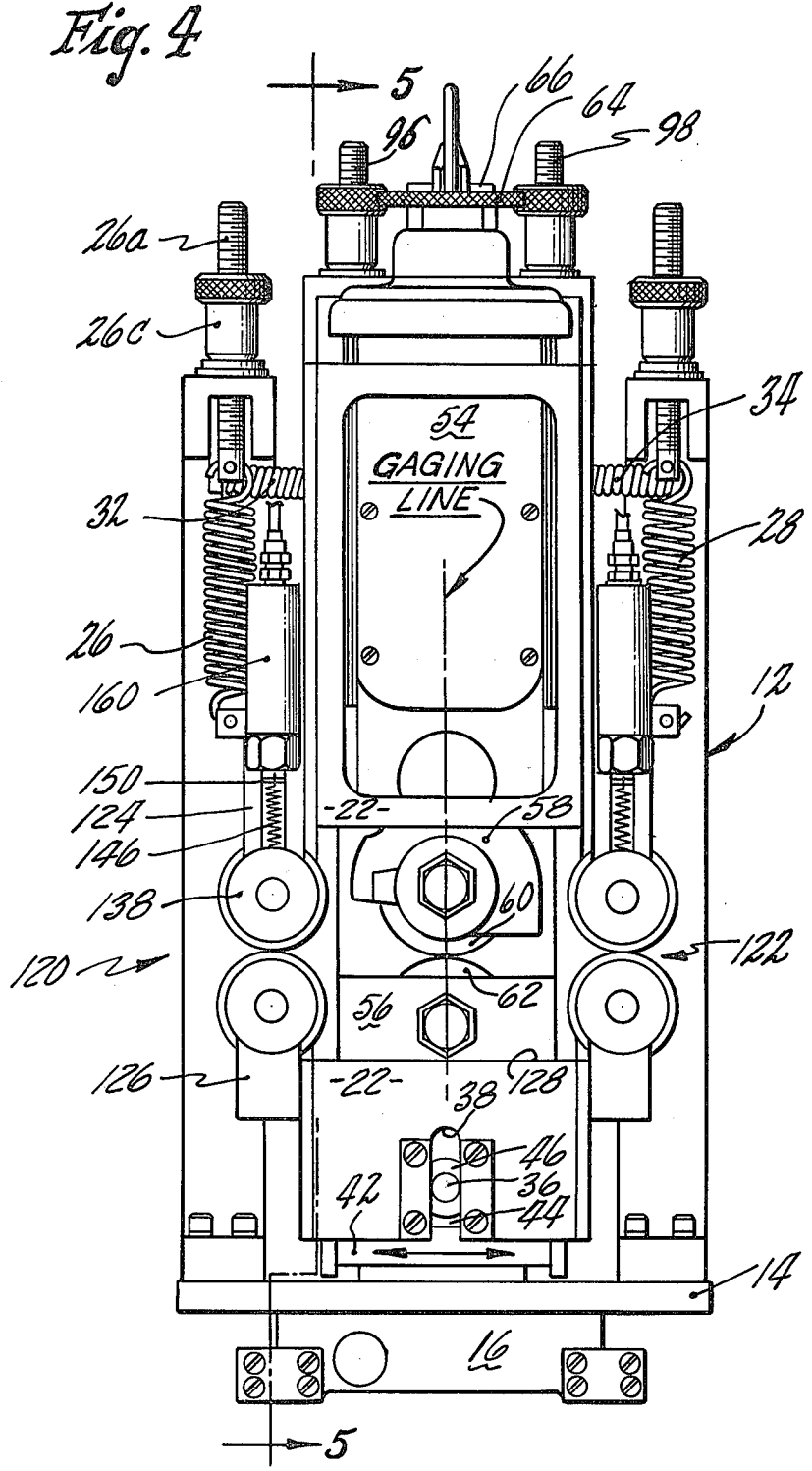
FIG. 4 is front elevation view of gage of FIG. 1.

Referring to FIGS. 1, 3 and 4, there is depicted a continuous contact gage, generally shown at 10, according to the invention. The gage 10 is adapted to determine variations in the thickness of strip material as it is being rolled. The gage 10 has a main support frame 12 which includes a base 14 mounted upon the usual slide 16 for axial sliding movement over the ways 18 and 20 thereof. By moving the gage 10 with respect to the slide 16, the gage 10 may be brought into or removed from engagement with a rolled strip. The main support frame 12 carries a floating mechanism capable of adjusting its attitude in order to accomodate various orientations of the rolled strip such that perpendicularity to the gaging line is always preserved.

The heart of the floating gaging mechanism is a floating frame 22 upon which most of the essentail gaging components are mounted. As best shown in FIG. 1, the floating frame 22 is suspended from the main support frame 12 by four extension springs 24, 26, 28 and 30 (see FIG. 5). Springs 24 and 26 resiliently support the floating frame 22 on its left side while springs 28 and 30 perform that function on the right side. The springs are hooked to vertically adjustable supports mounted on the top of the main support frame and fixed supports extending laterally from and fixedly connected to the floating frame. For example, spring 26 has its upper end connected to an adjustable support which is constituted by a threaded shaft 26a having a pin 26b in its lower end for engaging a spring hook and a knob 26c seated against the main support frame 12 and in threaded engagement with the shaft 26a. The spring 26 has its lower end connected to a fixed support which is constituted by a shaft 26d having a pin 26e in its end under which the lower end of spring 26 is hooked. All of the adjustable supports and the fixed supports for the extension springs are of respectively similar construction.

The floating frame 22 hangs from the main support frame 12 in a position spaced from back, sides and base 14 thereof such that it can translate in any direction. A spacing of about five eights of an inch between the floating frame 22 and the main support frame 12 should normally be sufficient. There are no significant positive constraints to forward or vertical upward movement of the floating frame 22, the main support frame 12 being open at the top and at the front. Since displacements in a rolled strip will normally be small no positive stops to such latter mentioned movements are considered necessary. In order to bias the upper portion of the floating frame 22 to a center position between sides two laterally extending extensions springs 32 and 34 are preferably connected between the sides of the floating frame 22 and the respective sides of the main support frame 12.

Figure 5:
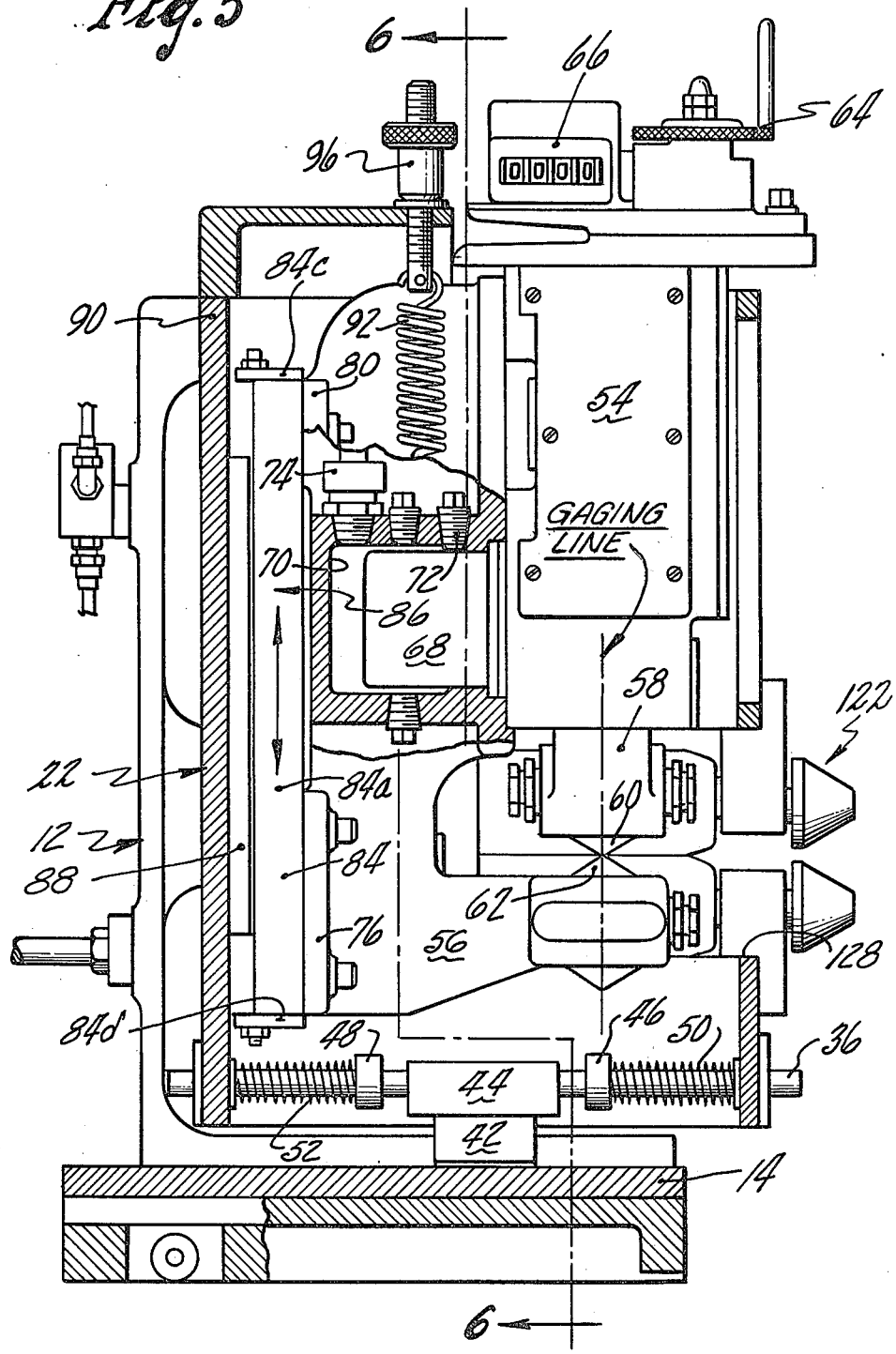
FIG. 5 is a sectional view of the gage, taken substantially along the line 5—5 of FIG. 4.
Figure 6:
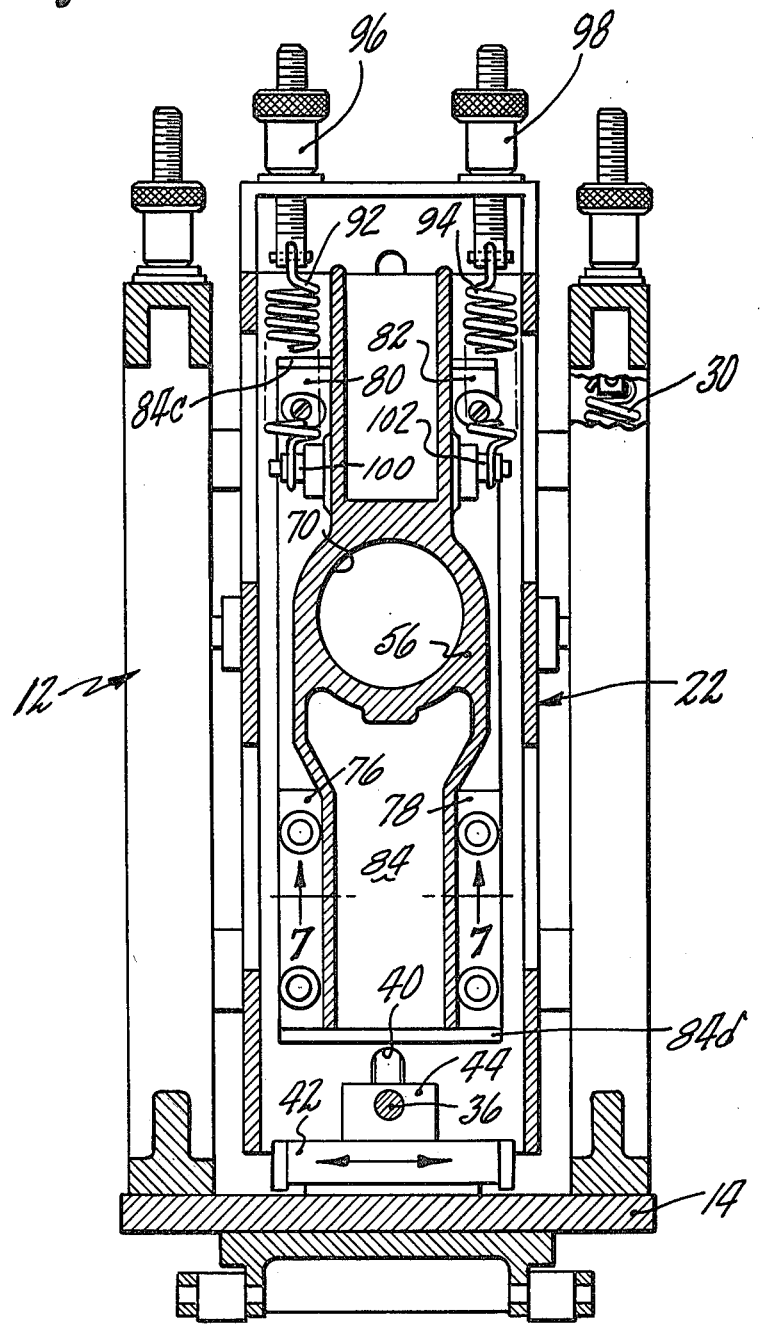
FIG. 6 is sectional view, taken substantially along the line 6—6 of FIG. 5, but with the gage head removed.

With continued reference to FIGS. 1, 3 and 4 and further reference to FIGS. 5 and 6, it will be appreciated that any twisting or rotation of the floating frame 22 about the vertical axis is impossible because of the provision of a rod or torsion bar 36, the ends of which are received within vertically extending slots 38 and 40 in the front and rear walls of the floating frame 22. However, vertical movements of the floating frame are not impeded by the torsion bar 36 since the vertical walls of the slots 38 and 40 simply slide over the torsion bar 36 during vertical movements of the floating frame. In addition, lateral reciprocating movements of the floating frame 22 may proceed in an unrestrained manner because the torsion bar 36 is mounted for lateral translation in the direction of the double headed arrow (FIG. 6) upon a roller slide 42 which has its base secured to the base 14 of the main support frame 12. As best shown in FIGS. 5 and 6, the torsion bar embodies an intermediate section 44 of rectangular cross section which is fixedly attached to the table of the slide 42. The torsion bar 36 also incorporates lands 46 and 48 disposed outboard of the intermediate section 44 which respectively function as spring seats for compression springs 50 and 52. The springs 50 and 52, which have their opposite ends respectively seated against the floating frame in the areas of the slots 38 and 40, serve to exert a longitudinal centering force on the lower portion of the floating frame 22. It should be readily apparent that the torsion bar 36 will not prevent translation of the floating frame 22 in any direction nor will it prevent pivoting or tilting of the floating frame 22 about any horizontal axis.

The floating frame 22 carries a gage head assembly which brings to effect the measurement of thickness of sheet material as it is being passed therethrough. The main elements of the gage head assembly are a gage head 54, shown in perspective in FIG. 2, and a gage head mounting bracket 56 to which the gage head is secured. The gage head mounting bracket 56 is best shown in FIGS. 5 and 6. The illustrated gage head 54 is old in the art and a detailed description of its construction and operation may be found in U.S. Pat. No. 2,115,351. However, the gage head mounting bracket 56 is necessarily of slightly different shape than that shown in the aforementioned patent. It will be understood that the detailed construction of the gage head, per se, forms no part of this invention and that other gage heads may be employed in a gage of the invention.

Figure 2:
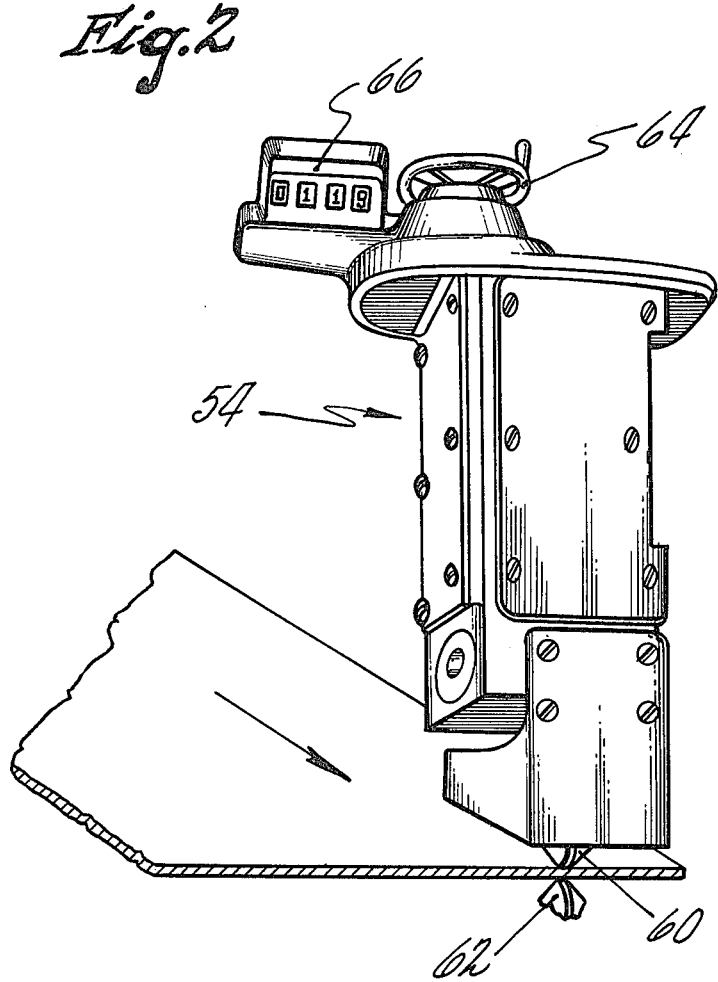
FIG. 2 is a perspective view of the gage head incorporated in the gage of FIG. 1.

With reference to FIGS. 2, 4 and 5, it may be seen that the gage head comprises a vertically slidable member 58 having at its lower end a freely rotatable strip contacting upper gage roller 60. Disposed under the vertically movable upper gage roller 60 is a lower gage roller 62 fixedly mounted upon the gage head mounting bracket 56 for free rotation. Rollers 60 and 62 are directly superimposed, one over the other, and rotate on parallel axes which extend longitudinally, perpendicular to the direction of strip movement. The rollers 60 and 62 and the vertically slidable member 58 define a gaging line (FIGS. 4 and 5) which extends through the centers of the rollers 60 and 62 and is perpendicular to axes of rotation of the rollers. For accurate measurements, the gaging line should always be perpendicular to the strip being measured.

The gage head 54 has a disk 64 which is rotated until a counter 66 indicates the number of thousandths of an inch in the desired thickness in the material being gaged. Such rotation raises the slidable member 58, and hence the upper gage roller 60, to such an extent that the separation between the rollers 60 and 62 equals the desired thickness in the material being rolled. As the strip passes between the separated rollers 60 and 62, variations in strip thickness will occasion slight up and down movements of the roller 60 and the attached vertically slidable member 58. Such movement will oscillate an armature (not shown) and cause variations in induced currents in juxtaposed coils (not shown) located in a cylindrical coil housing 68 (FIG. 5) screwed into the bracket 56. As shown in FIG. 5, the gage head mounting bracket 56 has a cavity 70 formed therein for receiving the housing 68. Threaded plugs 72 are furnished in bracket 56 adjacent to cavity 70 to permit coil and spring adjustments. A connecting member 74 establishes electrical communication between the coils and a transducer circuit (not shown), which may be of the type shown in U.S. Pat. No. 4,208,796. The transducer circuit is, of course, connected to some form of indicating instrument (not shown), such as an analog meter, which will display thickness variations so that a mill operator can control strip thickness. The signal from the transducer circuit may alternatively be directed to a computer adapted to directly control the the thickness of a rolled strip.

With reference to FIGS. 1, 5 and 6, the details of the gage head assembly's connection to the floating frame may best be appreciated. The gage head mounting bracket 56 is furnished with four flanges 76, 78, 80 and 82 which are bolted to the table 84 of a roller slide 86 which has its base 88 fixedly secured to the rear wall 90 of the floating frame 22. The table 84 is vertically slidable with respect to the floating frame as indicated by the double headed arrow of FIG. 5. Hence, the entire gage head assembly may move upwardly and downwardly with respect to the floating frame 22. A pair of extension springs 92 and 94 are respectively hooked to vertically adjustable supports 96 and 98 (which are similar to support 26) mounted on top of the floating frame 22 and to fixed supports 100 and 102 extending laterally from and fixedly connected to the gage head mounting bracket 56. The springs 92 and 94 urge the gage head assembly upwardly to insure firm engagement between the lower gage roller 62 and the undersurface of a rolled strip.

Turning to FIGS. 7 and 8 and with continued reference to FIG. 5, it will be noted that the table 84 of the slide 86 has longitudinal sides 84a and 84b and end plates 84c and 84d which together define an open box-like structure. As best shown in FIG. 7, the base 88 includes V-ways 104 and 106 attached to the body thereof by mounting screws 108 and 110. The slide also incorporates a pair of V-ways 112 and 114 secured to the table 84 by mounting screws similar to those associated with the other V-ways. The sliding interengagement between the V-ways is occasioned by respective axial arrays of crossed roller bearings 116. As shown in FIG. 8, the roller bearings 116 in each strip have alternately opposed axes. Screw 118 allows for preload adjustment. A slide assembly, as shown, permits superior travel accuracies to be attained. The basic elements of such a slide assembly are commercially available from Micro Slides Inc., of Westbury, New York. With regard to the slide 42, it should be noted that it is of the same design as the slide 86.

Since it is essential to keep the gaging line perpendicular to the rolled strip, a pair of guide roll assemblies, generally designated 120 and 122, are attached to the respective slides of the floating frame 22. The rolled strip to be measured will be securely clamped between the rolls of the assemblies to insure maintenance of such perpendicularity. Notwithstanding the provision of guide roll assemblies the gaging mechanism must still necessarily float since the rolled strip could easily exert forces on the rolls of the guide roll assemblies which could beget their separation in the absence of an accommodating change in attitude of the gaging mechanism. Succinctly stated, the gage must accomodate changes in attitude of the rolled strip.

FIGS. 1, 4 and 9 best depict the guide roll assemblies 120 and 122, FIG. 9 showing the assembly 120 (which is substantially identical to the assembly 122) partly in section. The guide roll assembly 120, for example, incorporates mounting brackets 124 and 126 which are fixedly secured to the floating frame 22 in vertically spaced relationship adjacent the transversely extending opening 128 in the lower portion thereof. An upper shaft 130 has portions adjacent its ends disposed within elongated openings 132 and 134 in the respective legs of the bracket 124 so as to permit limited vertical movement of the shaft 130. The ends of the shaft 130 are provided with enlarged diameter segments 136 and 138 to thereby secure the shaft against axial displacements. The segments 136 and 138 have pins 140 and 142 projecting therefrom, over which are respectively hooked the ends of small extension springs 144 and 146 located in recesses in the ends of the bracket 124. The upper ends of the springs 144 and 146 are respectively hooked over pins 148 and 150 extending across the recesses. The springs serve to maintain the shaft 130 in contact with the upper walls of the openings 132 and 134 for reasons discussed hereinafter. An upper guide roll 152 is mounted for rotation upon the shaft 130. A lower guide roll 154 is mounted for rotation upon a shaft 156 fixedly positioned in the lower mounting bracket 126. The lower guide roll 154 and shaft 156 are similar to those described heretofore with the exception that the end segments do not embody any pins for mounting springs.

The springs 144 and 146 function to hold the shaft 130 and guide roll 152 in an upper position as shown in FIG. 1, above illustrated in FIG. 9, whereby a rolled strip may initially be inserted between the guide rolls. The frustoconical surfaces on the enlarged diameter segments and on the guide rolls facilitate initial insertion of a rolled strip. Air cylinders 158 and 160 have threaded portions 162 and 164 which are secured to the bracket 124. The plungers of the air cylinders carry respective shoes 166 and 168 which engage and push the shaft 130 downwardly in response to sufficient air pressure being directed into their chambers via the tubing shown in FIG. 1. Such an action will press the guide roll 152 downwardly against the rolled strip which will be sandwiched between the guide rolls, thereby to maintain perpendicularity between the gaging line and the rolled strip. When air pressure is relieved, the springs 144 and 146 will serve to move the upper guide roll 152 upwardly away from the lower guide roll 154.

In operation, a rolled strip will be clamped securely by the guide roll assemblies 120 and 122 and the rolling process commenced. As the strip passes through the gage 10, the lower gage roller 62 will be urged upwardly into firm engagement with the undersurface of the strip, the upper surface thereof being in contact with the upper gage roller 60. The upper gage roller 60 will undergo small upward and downward movements in respense to variations in strip thickness. Should the strip attitude vary the floating frame 22 may translate in any direction and tilt about any horizontal axis to accommodate such variations, whereby the guide rolls of both assemblies 120 and 122 will remain clamped on the strip. In addition, the axes of rotation of the gage rollers 60 and 62 will always be perpendicular to the direction of strip movement because of the restraint against rotation of the floating gaging mechanism, as provided by the torsion bar 36.

Obviously, many variations and modifications are possible in light of the above teachings without departing from the scope and spirit of the invention as defined in the appended claims. For example, the means employed to prevent rotation of the floating frame admits of many variations. Instead of the illustrated torsion bar arrangement, a structure connected to the back wall of the floating frame would also be workable.

We claim:

1. In a continuous contact gage for measuring the thickness of a rolled strip of the type comprising: a main support frame, a floating frame supported on the main support frame and a gage head assembly, having upper and lower gage rollers, mounted on the floating frame, and two guide roll assemblies mounted on the sides of the floating frame, the improvement comprising:

a plurality of support springs interconnecting the floating frame and the main support frame such that the floating frame is spaced from the main support frame whereby the floating frame can translate in any direction and pivot about any horizontal axis:

the gage head assembly being mounted for axial sliding movement upon the floating frame to enable the gage head assembly to move vertically with respect to the floating frame;

at least one spring interconnecting the gage head assembly and the floating frame such that the gage head assembly is biased in an upward direction whereby the lower gage roller may firmly engage the undersurface of the rolled strip; and a rotation preventing structure mounted on the main support frame and adapted to prevent rotation of the floating frame about a vertical axis while permitting translation thereof in any direction and pivoting thereof about any horizontal axis.

2. The improvement of claim 1, further including a plurality of vertically adjustable spring supports mounted upon the main support frame and respectively connected to the support springs.

3. The improvement of claim 2, wherein there are two springs disposed on either side of the gage head assembly for biasing the gage head assembly in an upward direction.

4. The improvement of claim 1 further including:

a slide having a table and a base over which the table is slidable, the base being connected to the floating frame and the table being connected to the gage head assembly such that the vertical sliding movement of the gage head assembly is guided by the movement of the table over the base.

5. The improvement of claim 1, wherein the rotation preventing structure comprises:

a torsion bar; and a slide interconnecting the torsion bar and the main support frame such that the torsion bar can translate laterally with respect to the main support frame but is restrained from pivoting about a vertical axis.

* * * * *